United States Patent Office 3,211,987
Patented Oct. 12, 1965

3,211,987
**EXCITATION SYSTEM FOR A DYNAMO-
ELECTRIC MACHINE**
James A. Gatlin, Riverdale, Md., and Alan B. Shimp,
Wilkins Township, Allegheny County, Pa., assignors to
Westinghouse Electric Corporation, Pittsburgh, Pa., a
corporation of Pennsylvania
Filed Sept. 18, 1962, Ser. No. 224,463
8 Claims. (Cl. 322—24)

This invention relates in general to control apparatus and more particularly to excitation systems.

The advent of high power semiconductor rectifier devices, has made the self-excitation of alternating-current generators practical. Several excitation systems have been developed using semiconductor devices. However, their performance has had disadvantages in that some designs provided poor voltage regulation with varying power factor, or provided no control of generator voltage at leading power factor; other designs have non-linear components making prediction of operation from calculations difficult. Still other disadvantages of present systems are poor transient response and the requiring of the control element to supply the total excitation current required by the field winding. It is, therefore, desirable that a static excitation system for self-excited alternating-current generators be provided that has excellent transient response, will perform at any power factor, has only a small portion of the excitation current supplied by the control element, and uses linear, standard components.

Accordingly, it is the general object of this invention to provide a new and improved excitation system for a dynamoelectric machine.

Another object of this invention is to provide a new and improved regulating system for controlling the excitation of a dynamoelectric machine.

It is a more particular object of this invention to provide a new and improved static excitation system for a dynamoelectric machine that has improved transient response characteristics.

Briefly, the present invention accomplishes the above cited objects by applying two scalar currents to the generator field circuit. The first current being only slightly less than the value of excitation required by the generator at any given load power factor, and the second current being a small amount of excitation produced in response to an error signal derived from a voltage regulator. The first current is responsive to both the output voltage and current of a dynamoelectric machine and is compensated for changes in power factor. This first current is applied directly to the field circuit of the dynamoelectric machine without going through any control devices. Only the second current, which is a very small portion of the excitation current required, goes through the control devices. This arrangement provides an excitation system having a very good transient response, and allows small control devices to be used since they do not carry the total excitation current required by the dynamoelectric machine.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIGURE 1 shows the basic electrical circuit embodying the teachings of this invention;

FIGURE 1 shows a circuit diagram of a basic circuit embodying the teachings of this invention. It is a completely self-excited system, with the total excitation current being derived from the output voltage of the dynamoelectric machine, specifically, the three-phase alternating-current generator 12. In the embodiment shown in FIG. 1, the generator 12 comprises an armature 14 and an excitation field winding 16. The generator 12 is disposed to supply alternating-current energy to line conductors 18, 20 and 22 through the output terminals 24, 26 and 28, respectively, of the armature 14.

In general, the excitation current $I_f$, flowing through field winding 16 of the alternating-current generator 12 is made up of two currents, $I_{f1}$ and $I_{f2}$, which add arithmetically at the output of rectifiers 34 and 36 to line conductors 30 and 32. Current $I_{f1}$, produced by vector summing circuit 40 is the major portion of the field current $I_f$ and could be arranged to provide sufficient excitation to the generator 12 in itself. However, to compensate for voltage output changes, the vector summing circuit 40 is arranged to provide slightly less current than the value of excitation current $I_f$ required by the generator 12 at any given load power factor over the operating range. The additional excitation current required is provided by a small amount of current from the voltage regulator 50 as amplified by power amplifier 60. The scalar addition of current $I_{f2}$ to current $I_{f1}$ accomplishes the required voltage regulation, as current $I_{f2}$ is proportional to an error signal or signal proportional to the deviation of the generator output voltage from a predetermined value. It will be noted that the major portion of the field excitation current, $I_{f1}$, is impressed directly upon the generator field 16 by virtue of rectifier 36, without going through any control device. Therefore, the current $I_{f1}$ is not delayed in any manner from reaching the generator field 16 and any change in current $I_{f1}$ is almost immediately reflected in the field circuit current $I_f$.

Figure 3:
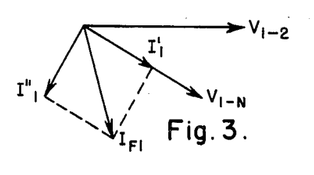
FIGS. 3, 4 and 5 are vector diagrams explanatory of the operation of a portion of the circuits shown in FIGS. 1 and 2.
Figure 4:
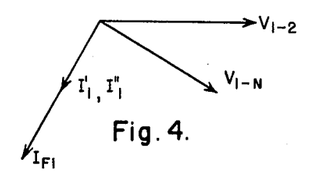
Figure 5:
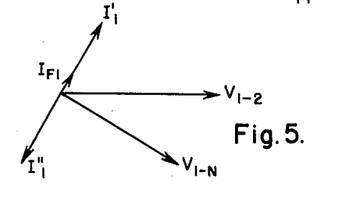

Current $I_{f1}$ is proportional to the vector sum of two currents produced in vector summing circuit 40. One of these currents, $I_1'$, is proportional to the generator line current $I_1$ and is produced by current transformers 62, 64 and 66 which are disposed in inductive relationship with the generator line conductors 18, 20 and 22, respectively. The other current $I_1''$ is responsive to the generator line-to-neutral voltage, but lagging it by substantially 90° by action of the inductive reactors 72, 74 and 76. The inductive reactance of reactors 72, 74 and 76 is large compared with the field inductive reactance. Thus, the current $I_1''$ is proportional to the generator output voltage but substantially 90° out of phase in the lagging direction with it. As hereinbefore stated, the currents $I_1'$ and $I_1''$ combine vectorially to form current $I_{f1}$ which is applied to rectifier 36 at terminals 82, 84 and 86. FIGURES 3, 4 and 5 show vertorially the combining of currents $I_1'$ and $I_1''$ for different circuit power factor conditions. FIG- URE 3 illustrates the formation of current $I_{f1}$ from the current $I_1'$ and $I_1''$ at unity power factor. Current $I_1'$ is in phase with the line-to-neutral voltage $V_{1N}$ and $I_1''$ lags line-to-neutral voltage $V_{1N}$ by nearly 90° because of the action of reactor 72. The resultant current $I_{f1}$ is formed as illustrated in FIG. 3.

FIG. 4 illustrates the formation of $I_{f1}$ from currents $I_1'$ and $I_1''$ at zero power factor lag. As illustrated, both currents $I_1'$ and $I_1''$ lag the line-toneutral voltage $V_{1N}$ by approximately 90° and the resultant current $I_{f1}$ is equal to the arithmetic summation of the currents $I_1'$ and $I_1''$.

FIGURE 5 illustrates the formation of current $1_{f1}$ from current $I_1'$ and $I_1''$ at zero power factor lead. Current $I_1'$ leads the line-to-neutral voltage $V_{1N}$ by substantially 90° and current $I_1''$ lags line-to-neutral voltage $V_{1N}$ by approximately 90°. In this case, the resultant current $I_{f1}$ is the arithmetic difference between currents $I_1'$ and $I_1''$.

As shown by FIGS. 3, 4 and 5, the current $I_{f1}$ supplied by vector summing circuit 40 is a maximum at zero power factor lag and a minimum at zero power factor lead. This is in accordance with the excitation requirements of the self-excited alternating-current generator, and FIGS. 3, 4 and 5 graphically illustrate that the invention will remain in control and supply the excitation requirements at any circuit power factor. As the circuit power factor changes, the resultant current $I_{f1}$ changes accordingly to compensate for the power factor change.

Referring again to FIG. 1, one side of inductive reactor 72 is connected to line conductor 18 at terminal 88. The other side of inductive reactor 72 is connected to terminal 94 and thus through line 104 to rectifier 36, which may be a three phase full wave bridge rectifier, at terminal 82. Similarly, reactor 74 has one side connected to line conductor 20 at terminal 90 and the remaining side of reactor 74 is connected to terminal 96 and thus to rectifier 36 through line 106 at terminal 84. Reactor 76 has one side connected to line 22 at terminal 92 and its remaining side is connected to terminal 98 and thus to rectifier 36 through line 108 at terminal 86. Current transformers 62, 64 and 66 each have one side connected together at a common point 102. The remaining side of current transformer 62 is connected to line 104 at terminal 94 between rectifier terminal 82 and inductive reactor 72; the remaining side of current transformer 64 is connected to line 106 at terminal 96, between rectifier terminal 84 and reactor 74; and the remaining side of current transformer 66 is connected to line 108 at terminal 98, between rectifier terminal 86 and reactor 76.

The current transformers 62, 64 and 66 and reactor 72, 74 and 76 are selected so that the combination of series and shunt derived components of excitation current provides slightly less current $I_{f1}$ than the value of excitation current $I_f$ required by the generator 12 at any given load and power factor. Also, as hereinfore stated, the current $I_{f1}$ is the major portion of the excitation current and it is applied directly to the field winding 16 through rectifier 36. Current $I_{f1}$ does not go through any control devices which tends to give poor transient response.

As just described, the components of the vector summing circuit 40 are chosen so that they supply a large portion of the current $I_f$ required by the generator 12 at any given load power factor. The remaining portion of the current $I_{f2}$ required to produce the total field excitation current $I_f$ is supplied by the regulator 50 in combination with an amplifier 60. The regulator 50 senses any deviation of the output voltage from the generator 12 from a preset value. This is accomplished by lines 122, 124 and 126 from the regulator 50 to terminals 112, 114 and 116 on line conductors 18, 20, and 22, respectively. Any deviation of the output voltage on the conductors 18, 20 and 22 from generator 12 is turned into an error signal by regulator 50 proportional to the amount of this deviation. The error signal produced by regulator 50 is applied to amplifier 60 through line 132. The amplifier 60 obtains its power from the generator output through lines 134, 136 and 138 connected to lines 122, 124 and 126, respectively. The amplified error signal is applied to input terminals 142, 144 and 146 of rectifier 34, with the rectified output of rectifier 34 appearing on the direct-current bus 30 and 32 connected to the field circuit 16 of the generator 12. The output of rectifier 34 combines arithmetically with the output of rectifier 36 with the resulting current $I_f$ being the necessary excitation current required by the generator 12 to maintain a preset output voltage. It should be noted that this arrangement provides a fail safe excitation system in that a failure of the regulator and/or amplifier will result in only a slight change in the generator output voltage, as the current $I_{f2}$ supplied by the regulator-amplifier combination is a very small portion of the total excitation current $I_f$. Further, the invention does not require the use of any non-linear components. Therefore, accurate calculations may be made predicting the performance of the system. Also, no frequency sensitive components are required, eliminating the requirement of any complicated frequency compensation networks. Other advantages of supplying the major excitation current in self-excited alternating-current generators without going through control devices result from the fact that the control components that are used are low power devices and may be standardized or identical for all applications over a large range of alternating-current generator sizes.

Figure 2:
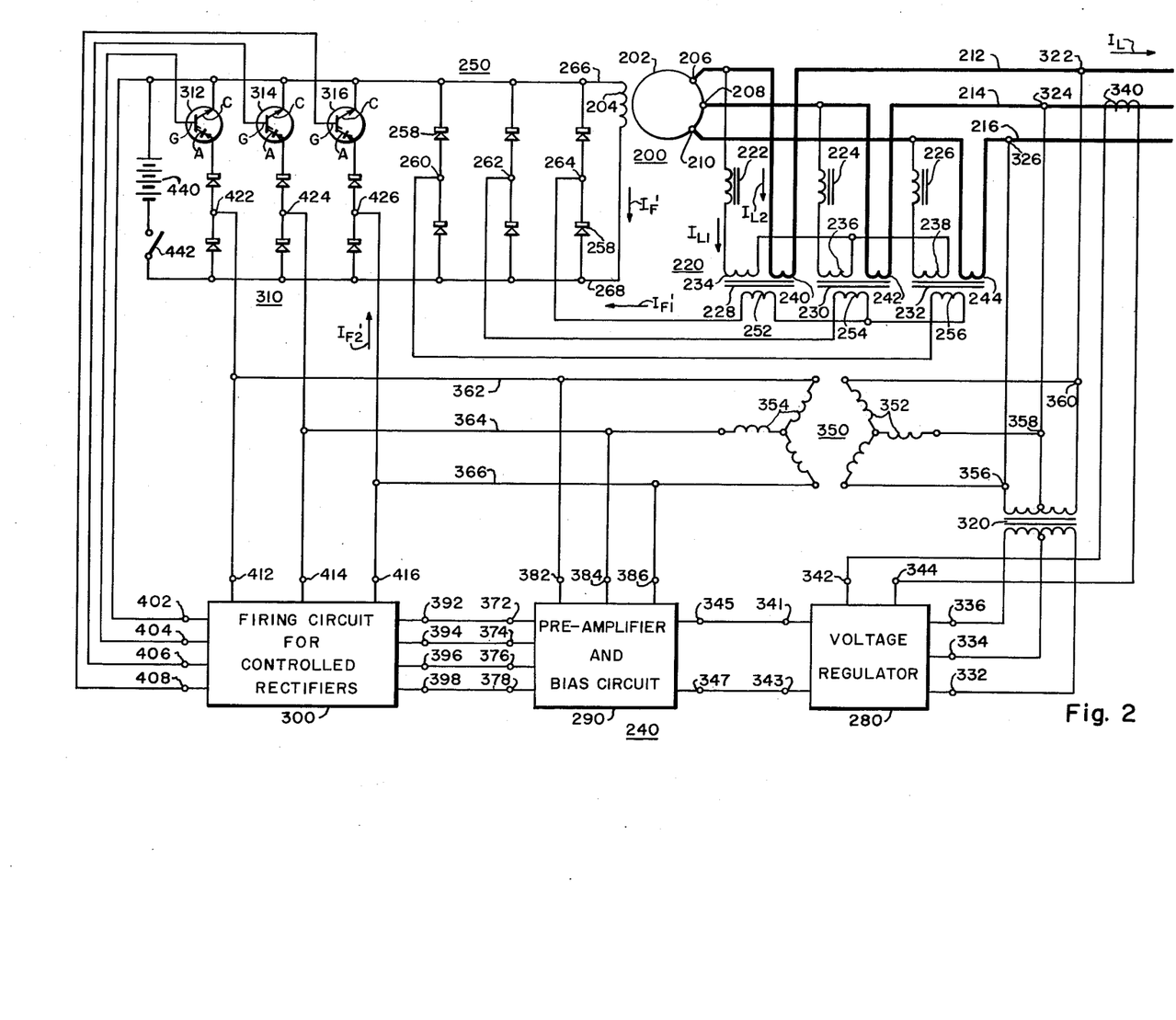
FIG. 2 is a schematic diagram of apparatus and circuits illustrating the invention.

FIGURE 2 is a circuit diagram illustrating the invention embodied in a complete self-excitation system for alternating-current generators. The three phase alternating-current generator 200 comprises an armature 202, an excitation field winding 204, and output terminals 206, 208 and 210. The generator 200 is disposed to supply alternating-current energy to line conductors 212, 214 and 216 from output terminals 206, 208 and 210 respectively.

The field excitation current $I_f'$ applied to the excitation field winding 204 of the generator 200 is formed by the scalar addition of the two currents $I_{f1}'$ and $I_{f2}'$. Current $I_{f1}'$ is derived from vector summing circuit 220 and is the major portion of the field current $I_f'$. Current $I_{f2}'$ is derived from voltage regulating circuit 240. Regulating circuit 240 compensates for deviations in the voltage output of the generator 200 from a predetermined value by supplying a small current $I_{f2}'$ which arithmetically adds to the current $I_{f1}'$ from vector summing circuit 220.

The vector summing circuit 220 comprises the linear reactors 222, 224 and 226, and the vector summing transformers 228, 230 and 232. The current $I_{f1}'$ is formed in the vector summing transformers 228, 230 and 232 by the vector addition of current components $I_{L1}$ and $I_{L2}$. The first component current $I_{L1}$, is proportional to the generator line-to-neutral voltage but lags it by substantially 90°. Current $I_{L1}$ is derived by means of the linear reactors 222, 224 and 226 and the shunt connected primary windings 234, 236 and 238 of summing transformers 228, 230 and 232, respectively. The second component, current $I_{L2}$, is proportional to, and in phase with, the generator line current $I_L$. Current $I_{L2}$ is derived by means of the series connected primary windings 240, 242 and 244 of the summing transformers 228, 230 and 232. Current components $I_{L1}$ and $I_{L2}$ are added vectorially in said summing transformers and the output of these transformers is rectified in rectifier 250 and applied to the field excitation winding 204 of the generator 200.

More specifically, the linear reactor 222 has one side connected to line conductor 212 and the other side to one side of primary winding 234 of summing transformer 228. Reactor 224 has one side connected to line conductor 214 and the other side to primary winding 236 of summing transformer 230. Similarly, reactor 226 has one side connected to line conductor 216 and the other side connected to one side of primary winding 238 of summing transformer 232. The remaining sides of the primary windings 234, 236 and 238 are connected together. Primary winding 240, of summing transformer 228, is connected in series with line conductor 212. Similarly, primary winding 242 of summing transformer 230, is connected in series with line conductor 214 and primary winding 244 of summing transformer 232 is connected in series with line conductor 216. The secondaries 252, 254 and 256 of summing transformers 228, 230 and 232 each have one side connected to rectifier 250. Rectifier 250 may be a three phase, full wave rectifier comprising semiconductor diodes 258. Secondary winding 252 of summing transformer 228 is connected to junction 264 of rectifier 250, secondary winding 254 of summing transformer 230 is connected to junction 262 and secondary winding 256 of summing transformer 232 is connected to junction 260. The remaining sides of secondary windings 252, 254 and 256 of said summing transformers are connected together. The output of rectifier 250 is delivered to the direct-current bus 266 and 268 and applied to the excitation field winding 204.

The linear reactors 222, 224 and 226, and vector summing transformers 228, 230 and 232 deliver their output current $I_{f1}'$ proportional to the generator power factor, voltage, and current to rectifier 250. Said vector summing transformer and linear reactors are selected to provide slightly less excitation current than is required for any particular circuit operating condition. The balance of the excitation current is supplied from the voltage regulating circuit 240.

In general, the voltage regulating circuit 240 is comprised of voltage regulator 280, pre-amplifier and bias circuit 290, firing circuit 300, and power amplifier circuit 310. The magnitude of current $I_{f2}'$ added to the current $I_{f1}'$ from the vector summing circuit may be controlled by varying the firing time of controlled rectifiers proportional to an amplified error signal derived from the voltage regulator 280, pre-amplifier 290 and firing circuit 300. The voltage regulator 280 is connected in circuit relation with the line conductors 212, 214 and 216, which are in turn connected to the generator terminals 206, 208 and 210, respectively. The voltage regulator 280 produces an output proportional to the amount of the deviation of the said output terminal voltage from a predetermined voltage. The error signal produced by voltage regulator 280 is amplified in the pre-amplifier circuit 290 and the amplified signal is applied to the firing circuits 300 of the power amplifier 310. The power amplifier 310 may employ silicon controlled rectifiers 312, 314 and 316 which are comprised of a gate electrode G, cathode electrode C, and anode electrode A. The controlled rectifiers 312, 314 and 316 operate as static switches, switching on once each voltage cycle at a firing angle or delay time determined by the amplified error signal from voltage regulator 280. The earlier in the voltage cycle the controlled rectifiers 312, 314 and 316 switch on, the greater the amount of excitation energy added to the field winding 204 by the power amplifier 310.

Input terminals 332, 334 and 336 of the voltage regulator 280 are connected to the generator output terminals 206, 208 and 210 by virtue of connections 322, 324 and 326 to the line conductors 212, 214 and 216, respectively. Potential transformer 320 transforms the generator output voltage to a value suitable for use by the voltage regulator 280. To provide reactive current compensation, input terminals 342 and 344 are connected to current transformer 340. Current transformer 340 provides a current proportional to the line current of the generator 200.

Power transformer 350, which obtains the proper voltage for certain circuit functions, has its primary winding 352 connected in circuit relationship with the generator output voltage by connections 356, 358 and 360. The secondary winding 354 of power transformer 350 is connected to the voltage supply bus 362, 364 and 366.

The error signal from output terminals 341 and 343 of voltage regulator 280 is applied to the input terminals 345 and 347, respectively, of the pre-amplifier and bias circuit 290. Voltage for the pre-amplifier and bias circuit 290 is applied to input terminals 382, 384 and 386 of the pre-amplifier and bias circuit 290 from the secondary winding 354 of the power transformer 350. The amplified error signal and bias voltage is applied to the input terminals 392, 394, 396 and 398 of the firing circuit for controlled rectifiers from the output terminals 372, 374, 376 and 378, respectively, of the pre-amplifier and bias circuit 290.

The secondary winding 354 of power transformer 350 and conductors 362, 364 and 366 supply voltage to the firing circuit 300 at input terminals 412, 414 and 416 and to the power amplifier 310 at connections 422, 424 and 426. The output of the firing circuit 300 is delivered from output terminals 402, 404, 406 and 408 to the power amplifier circuit 310. More specifically, the output of firing circuit 300 is applied to the control electrodes or gate electrodes G, of controlled rectifiers 312, 314 and 316, respectively, and the firing time or angle of the controlled rectifiers 312, 314 and 316 is controlled to provide the proper value of excitation current which is applied to the field winding 204 of the generator 200.

In order to insure positive build-up of the alternating-current generator voltage at terminals 206, 208 and 210, a separate source of power may be provided for momentary field flashing. This source of power may be a battery 440 or a source of alternating current rectified by separate rectifiers and applied to the generator field winding 204. The momentary application of direct-current power to the field circuit may be accomplished during start up by means of contacts 442 on a spring return start-up switch.

Figure 8:
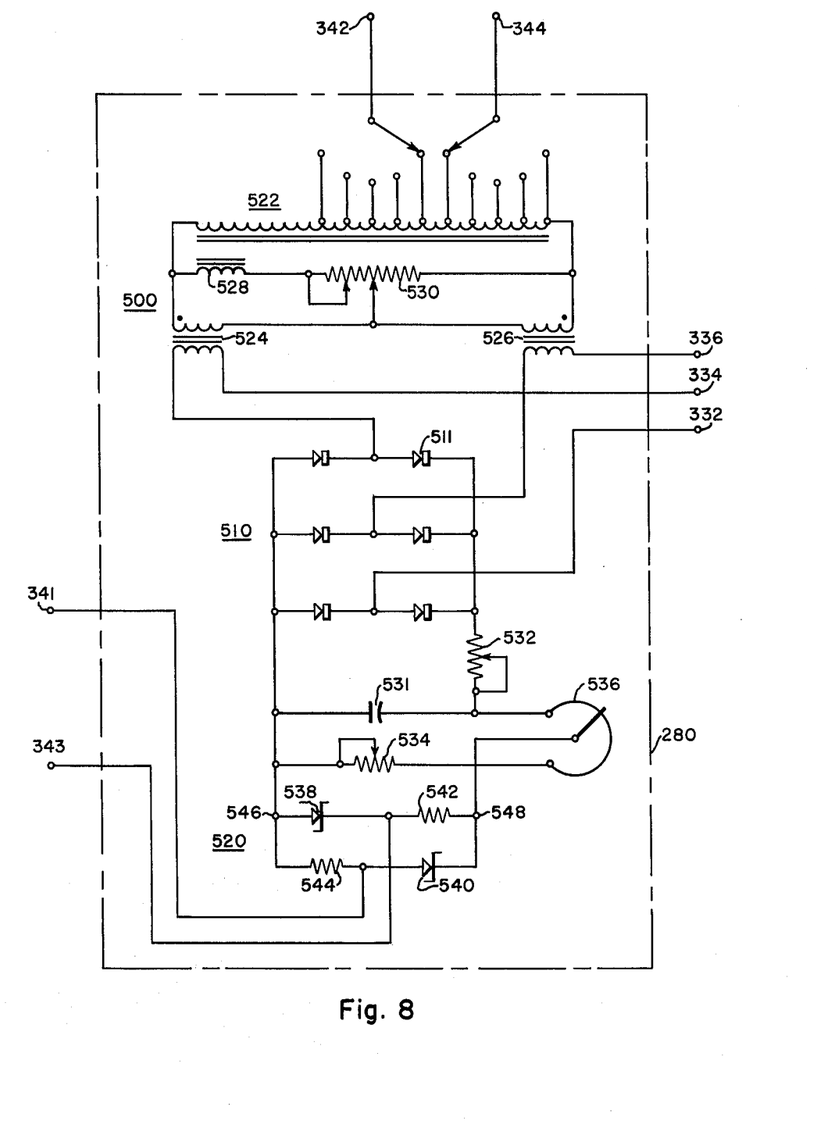
FIG. 8 is a schematic diagram of a voltage regulator that may be used in the circuit shown in FIG. 2.

A voltage regulator 280 that may be used is shown in FIG. 8. In general, voltage regulator 280 is comprised of a reactive current compensating circuit 500, a three phase full wave rectifier 510 and error detecting bridge 520.

The compensator circuit 500 comprises transformers 522, 524 and 526, reactor 528, and resistor 530. The action of this circuit is such that with normal voltage output of the generator, the alternating current voltage applied to the rectifier 510 is increased above the normal value in direct proportion to the reactive current being supplied by the generator. An increase in reactive current, therefore, causes the voltage regulator 280 to put out a signal to lower the generator output voltage. Thus, the generator output voltage is caused to droop in proportion to the reactive current being delivered by the generator. The amount of voltage droop may be adjusted by changing taps on transformer 526. This action of the compensator circuit 500 enables alternating current generators operated in parallel to share the reactive load in proportion to their ratings.

The reactive current compensating circuit 500 has its input terminals 342 and 344 connected to current transformer 340 as shown in FIG. 2. Input terminals 342 and 344 are connected to tapped transformer 522. The output of transformer 522 is mixed with the voltage signal in current transformers 524 and 526 and applied to rectifier 510. The inductor 528 and variable resistor 530 provide a balance adjustment for the output of transformer 522. Input terminals 332, 334 and 336 of voltage regulator circuit 280 are connected, as shown in FIG. 2, to potential transformer 320 and the potential transformer 320 is in turn connected to the generator line conductors 212, 214 and 216 at junctions 322, 324 and 326, respectively. The input signal to input terminals 332, 334 and 336 of voltage regulator 280 is thus responsive to and varies with the output voltage of the generator 200. The voltage signal obtained, as hereinbefore stated, is modified by the reactive current compensating circuit from compensating circuit 500 and current transformers 524 and 526. The modified signal is applied to the three phase, full wave rectifier 510, which may be comprised of semiconductor diodes 511 and the rectified signal is applied to error detecting bridge circuit 520. The settings of the variable resistor 534 and adjustable rheostat 536 determine the output voltage to be maintained by the regulator. The ripple in the output voltage of rectifier 510 is filtered by capacitor 531 and variable resistor 532.

The error detecting bridge 520 may be the conventional error detecting circuit comprising Zener diodes 538 and 540 in two legs of the bridge and resistors 542 and 544 in the remaining bridge legs. Any deviation between the magnitude of the reverse breakdown voltage of the Zener diodes 538 and 540 and the generator output voltage signal appears at terminals 546 and 548 of error detecting bridge 520 as a polarized direct-current error signal. The polarity of this signal depends upon whether the generator output voltage is above, or below, the desired voltage as determined by the setting on generator voltage adjustment 536. The error signal from voltage regulator 280 is applied to output terminals 341 and 343, and said output terminals are connected to input terminals 345 and 347 respectively, of the pre-amplifier and bias circuit 290.

Figures 9, 11:
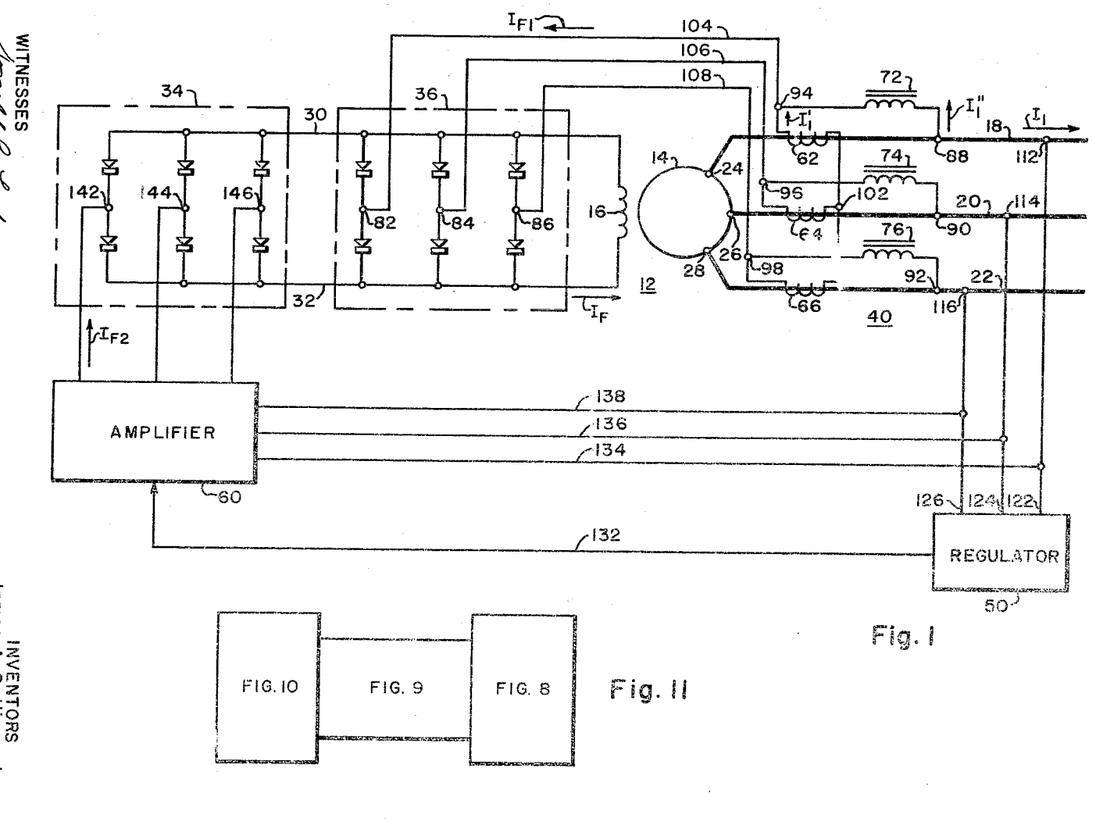
FIG. 9 is a schematic diagram of a pre-amplifier and bias circuit that may be used in the circuit shown in FIG. 2.
FIG. 11 shows how FIGS. 8, 9 and 10 should be placed relative to each other to obtain the proper circuit continuity.
Figure 9:
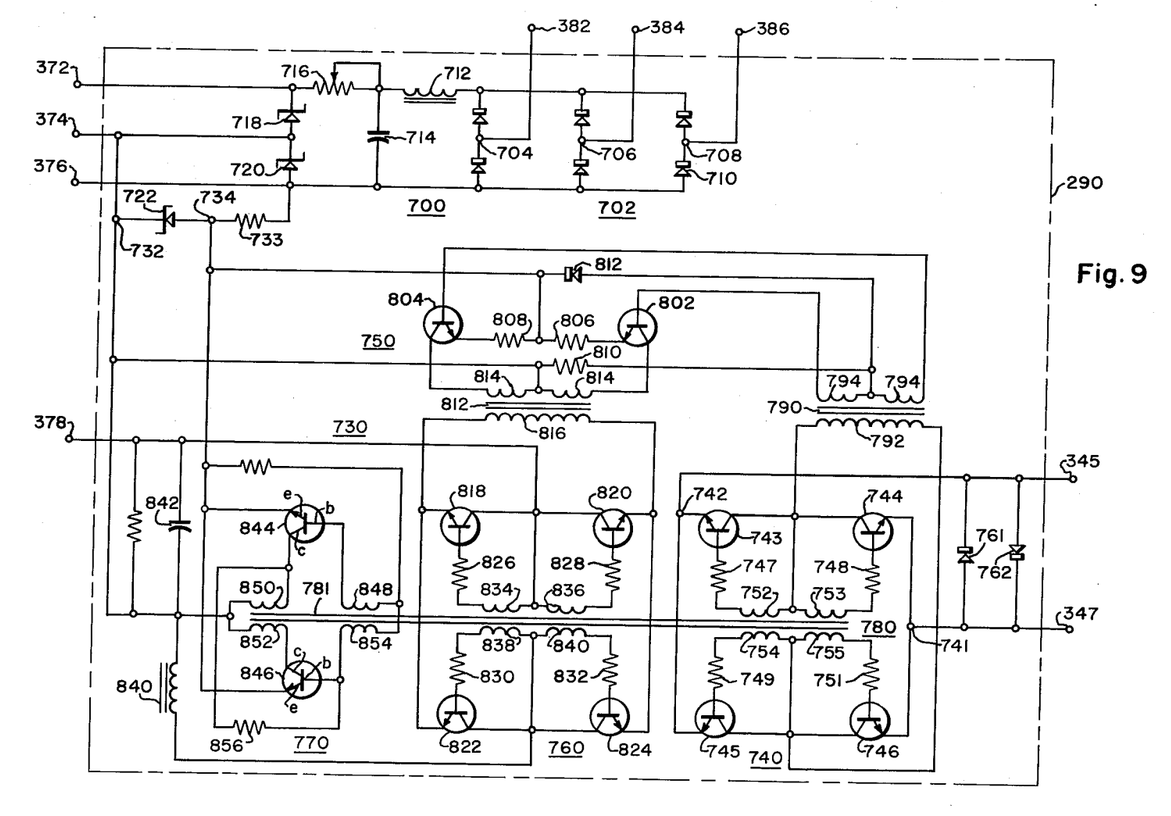

A pre-amplifier and bias circuit 290 that may be used is shown in FIG. 9. The bias circuit 700 has its input terminals 382, 384 and 386 connected to the secondary winding 354 of power transformer 350, as shown in FIG. 2. Input terminals 382, 384 and 386 are connected to the three phase full wave rectifier 702 at junctions 704, 706 and 708. Rectifier 702 may be comprised of semiconductor diodes 710. The ripple in the direct current voltage output of rectifier 702 may be filtered by inductor 712 and capacitor 714, and adjusted to the proper voltage value by variable resistor 716. Zener diodes 718 and 720 provide a regulated direct-current voltage at output terminals 372 and 376 by conducting current in their reverse direction when the desired voltage is exceeded. Bias voltage for the pre-amplifier circuit 730 is obtained from bias circuit 700 and further regulated by a Zener diode 722 connected across the bias supply voltage to the pre-amplifier circuit 730 at junctions 732 and 734. Resistor 733 is a ballast resistor for the Zener diode 722.

The pre-amplifier circuit 730 is a low-level direct-current amplifier whose purpose is to amplify the voltage level of the error signal from the voltage regulator 280 to a magnitude required by the firing circuit 300. The additional gain provided by the pre-amplifier circuit 730 is required to give the regulating system the desired accuracy.

The pre-amplifier in general consists of a chopper circuit 740, an alternating-current amplifier 750, a synchronous switch 760 and an oscillator circuit 770.

The input terminals 345 and 347 of the pre-amplifier and bias circuit 290 are connected to the chopper circuit 740 at junctions 741 and 742. The semiconductor rectifiers 760 and 761 across the input terminals 345 and 347 limit the signal input to a voltage below the forward breakdown voltage of the rectifiers and thus, protects the transistors used in the chopper circuit. The chopper circuit comprises transistors 743, 744, 745 and 746, resistors 747, 748, 749 and 751, and windings 752, 753, 754 and 755 of transformer 780.

As will be described in more detail later, the voltage across windings 752, 753, 754 and 755 of transformer 780 is a square wave. The polarity of the windings is such that transistors 743 and 744 and 745 and 746, are saturated on alternate half cycles. When transistors 743 and 744 are saturated, current flows through these transistors. On the alternate half cycle, the current flows through transistors 745 and 746 reversing the flux in the core 781 of transformer 780. The direct-current voltage applied to the chopper circuit 740 thus is converted to a square wave or an alternating voltage and is applied to the primary 792 of transformer 790.

The voltage appearing at the secondary 794 of transformer 790 is amplified in amplifier 750, which is a typical class B, push-pull amplifier. The amplifier utilizes two transistors 802 and 804 and resistors 806 and 808. Resistors 806 and 808, in series with the emitters of transistors 802 and 804, stabilize said transistors so that they will not go into thermal runaway at elevated junction temperatures. Bias voltage for transistors 802 and 804 is obtained across resistor 810 and rectifier 812 from the bias circuit 700. The output of the amplifier 750 is applied to primary winding 814 of transformer 812. The secondary 816 of transformer 812 is connected to the synchronous switch circuit 760. The synchronous switch circuit 760 comprises transistors 818, 820, 822 and 824, resistors 826, 828, 830 and 832 and windings 834, 836, 838 and 840 of transformer 780. The synchronous switch is electrically similar to the chopper circuit 740, but performs the opposite function. The chopper circuit 740 has the function of converting a direct-current voltage into an alternating-current voltage which can be transformed and applied to an alternating-current amplifier. Conversely, the synchronous switch takes the alternating-current voltage applied to it by the alternating-current amplifier 730 and rectifies it to a direct-current voltage. Since the windings of transformer 780 that drive the chopper circuit 740 and synchronous switch circuit 760 are common to the same core 781, they operate at the same frequency and phase relationship. The ripple in the direct-current output from the synchronous switch circuit 760 is filtered by inductor 840 and capacitor 842 and applied to the output terminals 378 and 374.

The oscillator 770 is comprised of transistors 844 and 846, each comprising an emitter electrode $e$, collector electrode $c$, and base electrode $b$, and windings 848, 850, 852 and 854 of transformer 780. The core 781 of transformer 780 is constructed of square loop material. To understand the operation of oscillator 770, consider resistor 856 an open circuit, consider transistor 846 just switched on or saturated and transistor 844 just made non-conducting. The supply voltage appears across winding 852 of transformer 780. A proportional voltage is induced into the other windings of transformer 780. The voltage across winding 854 keeps transistor 846 saturated and the voltage across winding 848 keeps transistor 844 cut off. As the current continues to increase, the arrangement of the windings 848, 850, 852 and 854 causes transistor 846 to come out of saturation. When transistor 846 comes out of saturation, the flux in the core 781 of transformer 780 reverses, reversing the polarity on winding 848. The flux reversal starts transistor 844 into saturation and transistor 846 is then cut off. This process continues, producing square wave voltages in all windings, as long as direct-current voltage is applied to the oscillator circuit 770.

Should transistors 844 and 846 become cut off at the same time, the circuit will not go into oscillation because only leakage currents will flow through the transistors 844 and 846 and there will be no flux reversal in the core 781 of transformer 780. This condition could arise when voltage is initially applied to the circuit. To insure that the circuit will go into oscillation, the resistor 856 is connected between the collector electrode $c$ of transistor 844 and the base electrode $b$ of transistor 846. When voltage is first applied, current flows from emitter electrode $e$ to base electrode $b$ of transistor 846 through resistor 856 and winding 850. This current flow saturates transistor 846 and starts oscillation.

Figure 10:
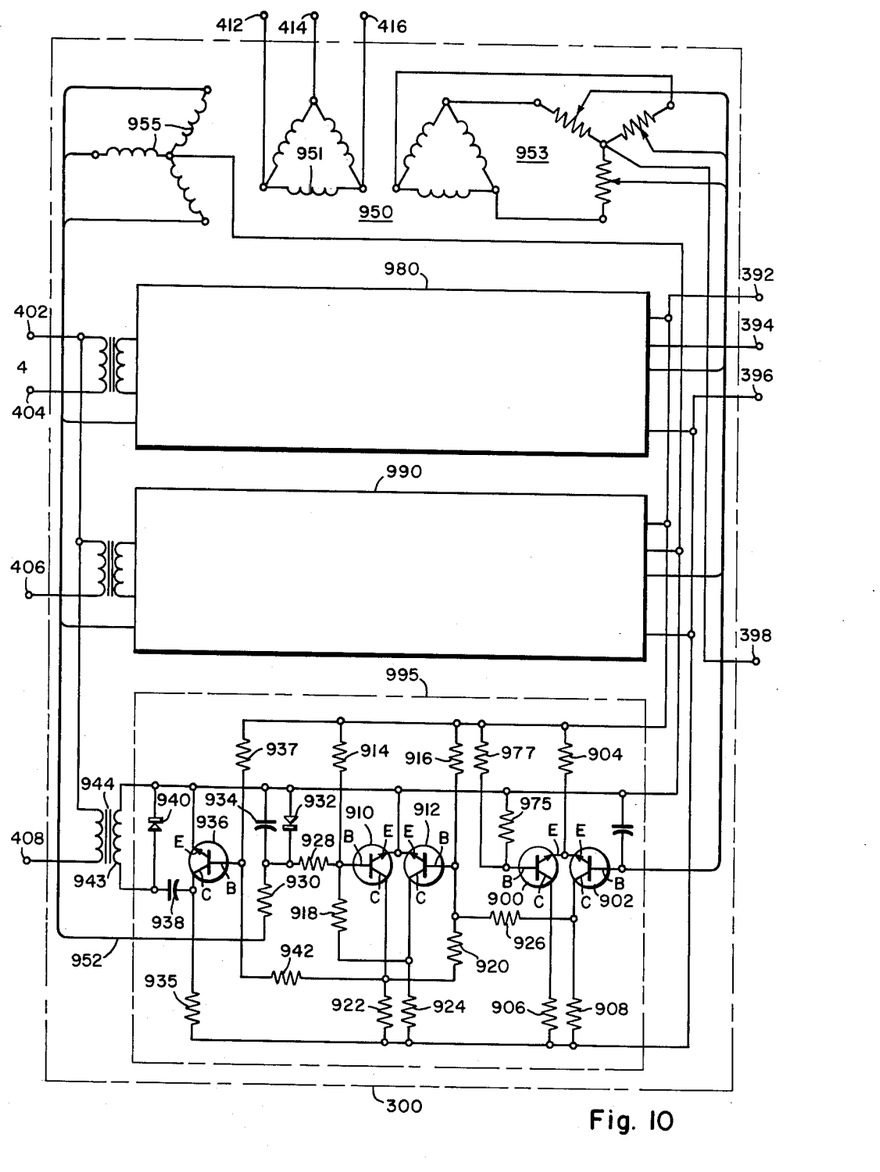
FIG. 10 is a schematic diagram of a firing control circuit for controlled rectifiers that may be used in the circuit shown in FIG. 2.

A firing circuit 300 for the controlled rectifiers 312, 314 and 316 that may be used is shown in FIG. 10. The purpose of the pulse firing circuit 300 is to provide a phase modulated pulse to a pulse transformer. The pulse transformer provides direct-current voltage isolation and distributes the pulse to the gate or control electrodes G of silicon controlled rectifiers 312, 314 and 316, as shown in FIG. 2.

The input to the firing circuit 300, as shown in FIG. 10, is applied to input terminals 394 and 398 and bias voltage is applied to input terminals 392 and 396.

In general, the transistors 900 and 902, resistors 904, 906 and 908 form a differential amplifier. Transistors 910 and 912 and resistors 914, 916, 918, 920, 922 and 924 form a flip-flop circuit. Resistor 926 couples the flip-flop circuit to the differential amplifier. Resistors 928 and 930, rectifier diode 932 and capacitor 934 shape a reset pulse which is applied to the flip-flop circuit. Transistor 936, capacitor 938, rectifier diode 940 and resistors 935 and 937 form the output circuit. Resistor 942 couples the flip-flop circuit to the output circuit. Transformer 944 is the pulse transformer.

In operation of the firing circuit 300, a voltage pulse is applied to the pulse transformer 944 when transistor 936 saturates because the primary winding 943 of the pulse transformer 944 is then connected across capacitor 938 which has been charged to a voltage equal to that of the positive bias supply voltage. The circuit is designed so that transistor 936 is made non-conducting for at least one half cycle and resistor 935 and capacitor 938 are selected so that their time constant is several times shorter than the half cycle of the reset voltage frequency.

Transistors 910 and 912 operate in switching mode with one being saturated while the other is non-conducting. This mode of operation is commonly called flip-flop. An alternating-current reset voltage from reset transformers 950 is applied to conductor 952 and to the pulse shaping circuit comprising resistors 922 and 930, rectifier diode 932 and capacitor 934. The alternating-current reset voltage is phased so that it is positive during the half cycle when the cathode C of the controlled rectifiers 312, 314 and 316 are positive. Therefore, emitter current flows in transistor 910 causing it to saturate. The collector of transistor 910 is clamped to ground and no emitter current flows in transistor 912, allowing capacitor 938 to charge to the voltage applied to input terminal 392. At the beginning of the next half cycle the anodes of the control rectifiers 312, 314 and 316 go positive which is a necessary condition for conduction, and the reset voltage goes negative, diode 932 conducts and the reset voltage appears across resistor 930. At this instant, the flip-flop circuit is in a stable state with transistor 910 saturated and transistor 912 non-conducting. At this point, a positive voltage at the base of transistor 912 will cause transistor 912 to turn on and transistor 910 to turn off.

The voltage at the base of transistor 912 is determined by the instantaneous voltage at the input terminals 394 and 398. This voltage is compared with the reference voltage across resistor 975. The differential amplifier comprising resistors 906, 908, and 904 and transistors 900 and 902 amplifies the voltage difference between the bases of transistor 900 and transistor 902. If the base of transistor 902 is positive with respect to the base of transistor 900, the emitter of transistor 900 is reverse biased and transistor 900 is turned off and current flows through resistor 908, transistor 902 and resistor 904. The voltage between input terminals 392 and 396 divides such that the collector of transistor 902 is negative with respect to the terminal 394. Similarly, if the base $b$ of transistor 900 is positive with respect to the base $b$ of transistor 902, the emitter $e$ of the transistor 902 is reverse biased and transistor 902 is turned off and current flows through resistor 906, transistor 900 and resistor 904. When transistor 902 is turned off there is very little voltage drop across resistor 908 and the collector of transistor 902 approaches the bias voltage at terminal 392. Therefore, a small voltage change at the bases of transistor 900 and transistor 902 drives the collector voltage from the negative value to a positive value approaching the positive bias at terminal 392. Resistor 926 is chosen so that transistor 912 will saturate when the collector voltage of transistor 902 is at its average value.

The voltage at the base $b$ of transistor 900 is determined by the voltage division between resistors 975 and 977. The direct-current input control voltage applied to terminals 394 and 398 has an alternating-current voltage from transformer 950 thrust upon it. This voltage leads the anode voltage of the control rectifier by 90 electrical degrees.

The three phase transformers 950 receive voltage at terminals 412, 414 and 416 from the secondary winding 354 of power transformer 350. The primary winding 951 is connected to input terminals 412, 414, and 416 and secondary winding 953 is connected in circuit relationship with the direct-current input signal so as to impress an alternating-current voltage on the direct-current control signal. The secondary winding 955 supplies the alternating-current reset voltage, hereinbefore described. Circuits 980 and 990 are identical to firing control circuit 995 just described.

In summary, the function of firing circuit 300 is to supply pulses to the gate electrodes G of the silicon control rectifiers 312, 314 and 316 shown in FIG. 2. The controlled rectifiers constitute the power amplifier element in the voltage regulating system and serve to control the amount of excitation energy delivered to the field 204 of the generator 200. The pulses delivered to the terminals 404, 406 and 408 of firing circuit 300 are synchronized with the alternating-current supply voltage supplied to the control rectifiers 422, 424 and 426 by power transformer 350. The pulses cause the controlled rectifiers to fire or switch on once during each positive half cycle of the supply voltage at a delay angle. The delay angle is proportional to the amplified error signal obtained from the voltage regulator 280. Once the controlled rectifiers 312, 314 and 316 are turned on, they remain conductive until the end of the positive half cycle of the supply voltage. When the current through the controlled rectifiers 312, 314, 316 drops to zero or a value below their holding current, the gate electrodes G regain control and block further control of current until another signal is applied to said gate electrodes. The earlier in the cycle at which the controlled rectifiers are turned on, the greater the amount of energy delivered from the supply voltage to the field circuit. Thus, the voltage regulator 280 controls generator excitation by varying the output of the controlled rectifiers by control of the firing circuit 300. As hereinbefore stated, the pulse circuit 300 is synchronized with the alternating-current supply voltage to the controlled rectifiers. During the negative half cycle of the supply voltage, when the controlled rectifier cathode C is positive with respect to the anode A, an alternating-current reset voltage is applied to firing circuit 300 to permit capacitor 938 to recharge to the bias voltage. The pulse to fire the controlled rectifier is obtained by discharge of capacitor 938 during the positive half cycle in response to the error signal appearing at terminals 398 and 394.

Figure 6:
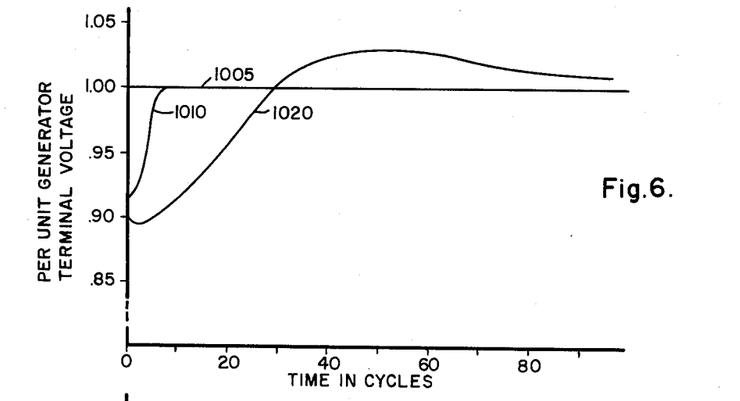
FIGS. 6 and 7 are graphs comparing the transient response of an excitation system constructed in accordance with the teachings of this invention with a conventional excitation system.
Figure 7:
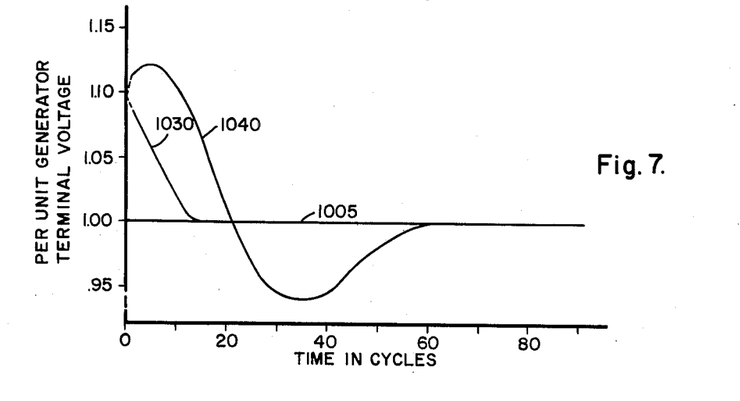

A static excitation system constructed according to the teachings of this invention, whereby only a small portion of the total excitation current goes through a regulating or control element, has greatly improved transient response characteristics. The improved transient response characteristics are graphically shown in FIGS. 6 and 7, compared with the transient response, under similar conditions and using the same generator, of a static excitation system where the total excitation current passes through a control element. Both FIGS. 6 and 7 show the generator terminal voltage as a function of time.

FIG. 6 shows a comparison of transient response characteristics for sudden application of a two per unit impedance load at zero power factor. Curve 1010 shows the generator terminal voltage when using the additive type static control described in this invention. Curve 1020 shows the generator terminal voltage when using a static control system where the total excitation current passes through the control element. In less than 10 cycles the curve 1010 is stabilized at the regulated output voltage line 1005, while curve 1020 still has not stabilized even at the end of 60 cycles.

FIGURE 7 shows a comparison of transient response characteristics for sudden removal of a 2 per unit impedance load at zero power factor. Curve 1030 shows the generator terminal voltage when using the additive type static control described in this invention. Curve 1040 shows the generator terminal voltage when using a static control system where the total excitation current passes through the control element. The curve 1030 has stabilized at the desired regulated output voltage line 1005 in approximately 15 cycles, while curve 1040 stabilized after approximately 60 cycles.

FIG. 11 has been included to show how FIGS. 8, 9 and 10 should be placed to obtain the proper circuit relationship and continuity.

It will, therefore, be apparent that there has been disclosed a static excitation system for self-excited alternating-current generators that has greatly improved transient response characteristics. Also, the system disclosed is insensitive to frequency, uses linear devices and standard components.

Since numerous changes may be made in the above described apparatus and different embodiments of the invention may be made without departing from the spirit thereof, it is intended that all matter contained in the foregoing description or shown in the accompanying drawings shall be interpreted as illustrative and not in a limiting sense.

We claim as our invention:

1. In an excitation system for a dynamoelectric machine having an excitation field winding and disposed to supply an output voltage to a load through output terminals, first means responsive to said output voltage of said dynamoelectric machine obtaining a first current responsive to the output voltage of said dynamoelectric machine and lagging the line to neutral voltage of said dynamoelectric machine, second means having linear characteristics responsive to the output load current of said dynamoelectric machine for obtaining a second current, said first and second currents being combined vectorially and applied to said excitation field winding, the vector sum of said first and second currents being a portion of the excitation current required by said excitation field winding, third means for obtaining a control current responsive to the deviation of said output voltage from a predetermined voltage, said control current being applied to said excitation field winding and providing the balance of the excitation current required by said excitation winding to maintain the output voltage of said dynamoelectric machine at a predetermined value.

2. In an excitation system for a dynamoelectric machine having an excitation field winding and disposed to supply an output voltage to a load through output terminals, first means comprising inductive reactors responsive to said output voltage of said dynamoelectric machine obtaining a first current responsive to the output voltage of said dynamoelectric machine and lagging by substantially ninety degrees the line to neutral voltage of said dynamoelectric machine, second means comprising current transformers having a linear characteristic responsive to the output load current of said dynamoelectric machine obtaining a second current, said first and second currents combining vectorially and applied to said excitation field winding, the vector sum of said first and second currents providing a portion of the excitation current required by said excitation field winding, third means obtaining a control current responsive to the deviation of said output voltage from a predetermined voltage, said third means connected in circuit relation with said excitation field winding and providing the balance of the excitation current required by said excitation winding to maintain the output voltage of said dynamoelectric machine at said predetermined value.

3. In an excitation system for a synchronous machine having an excitation field winding and disposed to supply an output voltage to a load through output terminals, first means comprising a plurality of inductive reactors responsive to said output voltage of said dynamoelectric machine obtaining a first current responsive to the output of said dynamoelectric machine and lagging the line to neutral voltage of said synchronous machine, second means comprising a plurality of current transformers having linear characteristics responsive to the output load current of said synchronous machine obtaining a second current, said first and second currents combining vectorially and applied to said excitation field winding, the vector sum of said first and second currents providing a portion of the excitation current required by said excitation field winding, third means obtaining a reference voltage, fourth means obtaining an error current responsive to the difference between said reference voltage and the output voltage of said synchronous machine, fifth means providing a unidirectional potential, said error current connected in circuit relation with said fifth means and said excitation winding to provide the balance of the excitation current required by said excitation winding to maintain the output voltage of said synchronous machine at a predetermined value.

4. In a regulating system for a synchronous machine having an excitation field winding and disposed to supply an output voltage to a load through output terminals, first means comprising inductance means responsive to said output voltage of said synchronous machine obtaining a first current responsive to the output voltage of said dynamoelectric machine and lagging the line to neutral voltage of said synchronous machine, second means comprising current transformer means having linear characteristics responsive to the output load current of said synchronous machine obtaining a second current, said first and second currents being combined vectorially, third means comprising rectifier means connected in circuit relation between said first and second means and said field winding to provide a portion of the excitation current required by said field winding, fourth means obtaining a reference voltage, fifth means obtaining an error current responsive to the difference between said reference voltage and the output voltage of said synchronous machine, said error current being connected in circuit relation with said third means to provide the balance of the excitation current required by said excitation winding to maintain the voltage at said output terminals of said synchronous machine at a predetermined value.

5. In a regulating system for a synchronous machine having an excitation field winding and output terminals, first means responsive to said output voltage of said dynamoelectric machine obtaining a first current responsive to the output voltage of said dynamoelectric machine that lags by substantially ninety degrees the line to neutral voltage of said synchronous machine, second means having a linear characteristic responsive to the output load current of said synchronous machine obtaining a second current in phase with said output load current, said first and second currents combining vectorially, third means comprising rectifier means connected in circuit relationship between the output of said first and second means and said field winding to provide a portion of the excitation current required by said field winding, fourth means obtaining a reference voltage, fifth means obtaining a polarized error current responsive to the difference between said reference voltage and the output voltage of said synchronous machine, said error current combining arithmetically in said rectifier means with the vector sum of said first and second currents to supply the balance of excitation current required by said excitation winding to maintain the output voltage of said synchronous machine at a predetermined value.

6. In a regulating system for a synchronous machine having an excitation field winding and disposed to supply an output voltage to a load through output terminals, first means comprising inductive reactance responsive to said output voltage of said synchronous machine obtaining a first current responsive to the output voltage of said dynamoelectric machine that lags the line to neutral voltage of said synchronous machine, second means comprising current transformer means having linear characteristics responsive to the output load current of said synchronous machine obtaining a second current, said first and second currents combining vectorially and connected in circuit relation with saaid excitation field winding to provide the major portion of the excitation current required by said field winding, third means obtaining a control current responsive to the deviation of said output voltage from a predetermined voltage, said third means connected in circuit relation with said excitation field winding to provide the balance of the excitation current required by said excitation winding to maintain the output voltage of said dynamoelectric machine at a predetermined value.

7. In a regulating system for a synchronous machine having an excitation field winding and disposed to supply an output voltage to a load through output terminals, first means comprising linear inductive reactors responsive to said output voltage of said synchronous machine obtaining a first current responsive to the output voltage of said dynamoelectric machine that lags by substantially ninety degrees the line to neutral voltage of said synchronous machine, second means comprising current transformers having linear characteristics responsive to the output load current of said synchronous machine obtaining a second current in phase with said output load current, said first and second currents combining vectorially in said second means, third means comprising rectifier means connected in circuit relationship between the output of said second means and said excitation field winding providing a portion of the excitation requirements of said excitation field winding, fourth means obtaining a reference voltage, fifth means obtaining a deviation current responsive to the difference between said reference voltage and the output voltage of said synchronous machine, said fifth means connected in circuit relation with said rectifier means, said deviation current and the vector sum of said first and second currents combining arithmetically in said rectifier means to provide the excitation current required by said excitation winding to maintain the output voltage of said synchronous machine at a predetermined value.

8. In a regulating system for a synchronous machine having an excitation field winding and output terminals, first means comprising inductive reactance connected in circuit relation with the output terminals of said synchronous machine obtaining a first current responsive to the output voltage of said dynamoelectric machine and lagging the line to neutral voltage of said synchronous machine, second means comprising current transformer means having linear characteristics obtaining a second current responsive to the output current of said synchronous machine, said first and second currents combining vectorially to provide a third current, third means comprising rectifier means connected in circuit relation between said first and second means and said field winding to provide a portion of the excitation requirements of said excitation field winding, fourth means comprising Zener diode means obtaining a reference voltage, fifth means obtaining an error signal responsive to the difference between said reference voltage and the output voltage of said synchronous machine, sixth means comprising rectifier means and controlled rectifiers connected in circuit relation with said excitation field winding, said controlled rectifiers connected in circuit relation with said fifth means and allowing a fourth current to flow in said excitation field winding responsive to said error signal, said fourth current adding arithmetically to said third current and forming the total excitation current supplied to said field winding.

References Cited by the Examiner
UNITED STATES PATENTS

| | | | |
|---|---|---|---|
| 2,454,582 | 11/48 | Thompson et al. | 322—25 |
| 2,879,464 | 3/59 | Carleton | 322—86 |
| 3,030,568 | 4/62 | Oda et al. | 322—25 |

LLOYD McCOLLUM, *Primary Examiner.*